United States Patent

Weinberger et al.

US006008291A

[11] Patent Number: 6,008,291
[45] Date of Patent: Dec. 28, 1999

[54] AQUEOUS POLYESTER DISPERSIONS OF STABILIZED VISCOSITY, THEIR PREPARATION AND THEIR USE AS BINDERS FOR WATER-THINNABLE COATINGS

[75] Inventors: Manfred Weinberger; Johann Billiani, both of Graz, Austria

[73] Assignee: Vianova Resins AG, Werndorf, Austria

[21] Appl. No.: 09/190,443

[22] Filed: Nov. 13, 1998

[30] Foreign Application Priority Data

Nov. 28, 1997 [AT] Austria ..................................... 2018/97

[51] Int. Cl.⁶ ....................................................... C08J 2/32
[52] U.S. Cl. ........................... 524/802; 528/272; 525/437; 525/438; 525/440; 525/446; 525/449; 524/81; 524/186; 524/261; 524/323; 524/539; 524/588; 524/591; 524/601; 524/604; 524/608; 524/801; 524/806; 428/480; 428/481
[58] Field of Search .............................. 528/272; 525/437, 525/438, 440, 446, 449; 524/81, 186, 261, 323, 539, 588, 591, 601, 604, 608, 801, 802, 806; 428/480, 481

[56] References Cited

U.S. PATENT DOCUMENTS

| | | | |
|---|---|---|---|
| 2,432,484 | 12/1947 | Moultton et al. | 88/1 |
| 3,324,055 | 6/1967 | Marks et al. | 260/17 |
| 3,986,997 | 10/1976 | Clark | 260/29.2 |
| 4,159,206 | 6/1979 | Armbruster et al. | 106/287 |
| 4,421,433 | 12/1983 | Villanueva | 401/175 |
| 4,526,910 | 7/1985 | Das et al. | 523/220 |
| 4,719,146 | 1/1988 | Hohage et al. | 428/331 |
| 5,576,397 | 11/1996 | Oberressl et al. | 525/444 |
| 5,698,625 | 12/1997 | Billiani et al. | 524/513 |

FOREIGN PATENT DOCUMENTS

| | | |
|---|---|---|
| 267 562 | 5/1988 | European Pat. Off. . |
| 295 403 | 12/1988 | European Pat. Off. . |
| 305 795 | 3/1989 | European Pat. Off. . |
| 355 761 | 2/1990 | European Pat. Off. . |
| 0 612 779 A2 | 8/1994 | European Pat. Off. . |
| 2 524 309 | 12/1976 | Germany . |
| 32 19 471 | 6/1981 | Germany . |
| 33 15 690 | 11/1983 | Germany . |
| 33 15 691 | 11/1983 | Germany . |
| 31 19 471 | 2/1990 | Germany . |
| 2 112 793 A | 7/1919 | United Kingdom . |
| 2 047 721 | 12/1980 | United Kingdom . |
| 2100271 | 12/1982 | United Kingdom . |
| 88/02389 | 4/1988 | WIPO . |
| 95/27762 | 10/1995 | WIPO . |

*Primary Examiner*—Samuel A. Acquah
*Attorney, Agent, or Firm*—Foley & Lardner

[57] ABSTRACT

Viscosity-stabilized aqueous polyester dispersions comprising an acid-functional polyester resin a, neutralizing agent b for the polyester resin a, the amount of neutralizing agent being sufficient to convert from 10 to 200% of the amount of substance of acid groups in the polyester resin a into salt groups by means of the amount of neutralizing agents added, the neutralizing agents being selected from ammonia and organic amines and also alkali metal hydroxides and alkaline earth metal hydroxides; if desired, an organic auxiliary solvent, silica in an amount such that the mass of $SiO_2$ is from 0.1 to 50% of the mass of the polyester resin, and water. The dispersions are useful in coating compositions.

18 Claims, No Drawings

AQUEOUS POLYESTER DISPERSIONS OF STABILIZED VISCOSITY, THEIR PREPARATION AND THEIR USE AS BINDERS FOR WATER-THINNABLE COATINGS

BACKGROUND OF THE INVENTION

1. Field of the Invention

The present invention relates to viscosity-stabilized aqueous polyester dispersions, to processes for preparing them and to their use.

2. Description of Related Art

The use of silica, or silicon dioxide, and/or hydrolyzable silicon compounds for improving certain properties in coating compositions has long been known. For instance, U.S. Pat. No. 2,432,484 describes the use of colloidal silicon dioxide in the form of a sol in water or other appropriate solvents, such as glycol ethers, for improving the abrasion resistance of the coatings it is used to produce. EP-A 0 180 129 discloses the use of amorphous, porous silica with a specific surface area of from 300 to 900 m$^2$/g in combination with alkylalkoxysilanes as a coating on plastics to improve their scratch resistance.

U.S. Pat. No. 3,986,997 describes aqueous coating compositions based on silanol condensates and on silicon dioxide, consisting of a dispersion of colloidal SiO$_2$ in a solution of a partial condensate of an alkylsilanol. Similar coating compositions are known for example, from DE-A 2 811 072, and contain from 30 to 50% by mass of colloidal silica and from 50 to 70% of siloxane. A coating composition comprising partially hydrolyzed alkylalkoxysilanes in alkaline solution, and silicon dioxide, is described in U.S. Pat. No. 3,324,055. U.S. Pat. No. 4,526,910 describes the preparation of colloidal silica in organic solvents by controlled hydrolysis of tetraalkoxysilanes in these solvents.

DE-A 30 14 411 describes an aqueous coating composition consisting of a melamine-formaldehyde resin, colloidal silicon dioxide, and an alkylalkoxysilane of the form RSi(OR)$_3$. The use of SiO$_2$ and silicon compounds is restricted essentially to improving the mechanical properties of coatings produced using the coating compositions thus modified.

There is as yet still little literature on improving Theological properties of coating compositions. EP-A 0 287 589 is directed to the use of alkylalkoxysilanes and aminoalkyltri-alkoxysilanes for functionalizing heteropolysaccharides, as thickeners for thixotropic coating compositions. EP-A 0 608 107 describes the preparation of externally emulsified, aqueous silica dispersions and aluminum silicate dispersions, which are formed by emulsifying pyrogenic (fumed) silica or aluminum silicates by means of auxiliary dispersants (emulsifiers) which form polyanions (metaphosphoric acid, polyphosphoric acid and the salts thereof and also boric acid and its salts are mentioned by way of example). The particle size of the resultant silica dispersions lies between 60 and 500 nm and depends very heavily on the concentration of emulsifier. The silica dispersion that is stabilized acidically in this way (that is, in an acidic environment) is used to increase the level of corrosion protection of aqueous coating compositions, in particular, epoxy resin dispersions.

However, alkali-stabilized aqueous silica dispersions (that is, non-externally emulsified, acidic silica dispersions, as described above) and alkoxysilanes or their successor products have not yet been mentioned in connection with polyester dispersions.

Polyester resins can be prepared in a known manner by polycondensation, preferably in the melt, of one or more polyfunctional organic hydroxy compounds with one or more polyfunctional organic carboxylic acids, with or without the addition of monofunctional aliphatic saturated or, preferably, unsaturated carboxylic acids. The terms "polyester resin" and "alkyd resin" are used here synonymously.

Aqueous dispersions of such polyester resins are usually stabilized anionically. This means that in the course of polyester synthesis, the polycondensation is terminated at a certain residual acid number (corresponding to a residual content of free carboxyl groups which is other than zero) and these acid groups (some or all of them) are then neutralized with bases, preferably with ammonia or amines, but also with alkali metal hydroxides or alkaline earth metal hydroxides. The neutralization forms strongly polar salt groups, and the polyester can then be dispersed in water.

The polyester resin dispersions obtained in this way are alkaline, generally having a pH of more than 7, preferably in the pH range from 8 to 10. In an aqueous medium they undergo (alkali-catalyzed) hydrolysis of the ester bonds, which may lead, inter alia, to a sharp reduction in viscosity over the course of a few months. Systems of this kind therefore not only have short storage and processing lives, but their technical usefulness may be significantly restricted as a result. This lack of stability is observed not only with the polyester resins of the composition described above (referred to below as "unmodified"); it also affects polyester resins modified with drying or nondrying fatty acids, and also acrylic-, urethane- and epoxy-modified polyester resins.

It has now been found that aqueous dispersions of modified or unmodified polyester resins which additionally comprise an alkali-stabilized aqueous silica dispersion are generally stable on storage and show substantially no drop in viscosity on storage at room temperature (from 20 to 25° C.) over a period of at least 6 months.

SUMMARY OF THE INVENTION

The present invention is therefore directed to a viscosity-stabilized aqueous polyester dispersion comprising: a) an acid-functional polyester resin, b) at least one neutralizing agent for the polyester resin a, the amount of said neutralizing agent present being sufficient to convert from 10 to 200% of the amount of substance of acid groups in the polyester resin a into salt groups by the neutralizing agent added, the neutralizing agent being selected from the group consisting of ammonia, organic amines, alkali metal hydroxides and alkaline earth metal hydroxides, c) optionally, an organic auxiliary solvent, d) silica in the form of an alkali-stabilized aqueous silica dispersion present in an amount such that the mass of SiO$_2$ in said silica dispersion is from 0.1 to 50% of the mass of said polyester resin, a, and e) water.

In further accordance with the present invention, there is also provided methods of using viscosity-stabilized aqueous polyester dispersions, as well as methods for their preparation.

Additional objects features and advantages will become apparent from the detailed description that follows.

DETAILED DESCRIPTION OF A PREFERRED EMBODIMENT

Aqueous dispersions of modified or unmodified polyester resins according to the present invention, which additionally comprise an alkali-stabilized aqueous silica dispersion are generally stable on storage and show substantially no drop in viscosity on storage at room temperature (from 20 to 25° C.) over a period of at least 6 months. Preferred stabilized dispersions show substantially no drop in viscosity over at least 12 and, with particular preference, over at least 18 months.

The content of silicon dioxide can be introduced for example, by adding aqueous silica dispersions to aqueous dispersions of polyesters (embodiment 1). It has additionally been found (embodiment 2) that the stabilizing content of silica can also be introduced into the polyester dispersion for example, by means of silicon compounds which are hydrolyzable with water, such as alkoxysilanes, and that the viscosity is likewise stabilized thereby. The combination of both these procedures also typically leads to a stabilization of the viscosity.

The invention therefore provides viscosity-stabilized aqueous polyester dispersions comprising a mixture of a) at least one acid-functional (with or without drying and/or nondrying fatty acids, or acrylic, urethane- or epoxy-modified) polyester resin, b) at least one neutralizing agent for the polyester resin, the amount of neutralizing agent being chosen so that it is able to neutralize or bind from 10 to 200% of the amount of substance of dissociable protons of the acid groups in the polyester resin; preferably, the amount of neutralizing agent added corresponds to from 30 to 100% neutralization, with particular preference to from 40 to 70% neutralization, the neutralizing agents being selected from ammonia and organic amines and also alkali metal hydroxides and alkaline earth metal hydroxides, c) optionally, or if desired, an organic auxiliary solvent, d) silica in the form of an alkali-stabilized aqueous silica dispersion in an amount such that its mass, calculated as $SiO_2$, is from 0.1 to 50% of the mass of the polyester resin, and e) water.

Preferably, the amount of silica dispersion is chosen such that the mass of $SiO_2$ is from about 0.2 to about 15 per cent, especially preferred from about 0.5 to about 8 per cent of the mass of the polyester resin a (in solid form).

Any desired acid-functional polyester resins a can be used. For example, "acrylic-modified polyester resins" can be prepared by emulsion polymerization of olefinically unsaturated monomers in an aqueous medium in the presence of a water-soluble polyester or alkyd resin, which can also have been modified by incorporation of epoxy resin structures. They are described, for example, in EP-B 0 267 562, EP-B 0 305 795, WO 95/27762 and EP-B 0 295 403 which are incorporated herein in their entirety by reference. The mass fraction of moieties that stem from the alkyd resin is usually from about 30 to about 80 per cent of the mass of the modified resin, and the mass fraction of those moieties that stem from the olefinically unsaturated monomers are from about 20 to about 70 per cent of the mass of the modified resin.

"Urethane-modified polyesters" can be used and include, for example, those for which the mass fractions in the mixture of the educts, or precursors (starting materials) that are employed are from about 10 to about 45%, preferably from about 15 to about 35%, of linear, branched or cyclic aliphatic polyols having 2 to 6 hydroxyl groups per molecule; from about 5 to about 35%, preferably from 10 to 30%, of polyfunctional carboxylic acids; from about 5 to about 30%, preferably from 10 to 25%, of polyfunctional, preferably difunctional, isocyanates; from 0 to about 70% of saturated or mono- or polyunsaturated fatty acids; and from 0 to about 20% of monofunctional aromatic or cycloaliphatic monocarboxylic acids. Similar and suitable resins are described, for example, in DE-A 33 15 690 and DE-A 33 15 691 which are incorporated herein in their entirety by reference. Alkyd resins modified both with acrylates and by incorporation of urethane structures can be used and are described, for example in DE-A 32 19 413 and DE-A 31 19 471, both of which are incorporated in their entirety by reference.

"Epoxy-modified polyesters" can be used and can be those polyesters in which mass fractions of up to about 40% of polyhydroxy compounds derived from polyepoxides have been incorporated in the polyester by condensation with the acid components. Such resins are described, for example, in EP-A 0 355 761, which is incorporated herein in its entirety by reference.

"Fatty acid-modified polyester resins" can be used and include those in whose monomer mixture a mass fraction of up to about 40% of the polyfunctional organic carboxylic acids has been replaced by monofunctional, saturated or unsaturated fatty acids. Such fatty acid-containing polyester resins are called "alkyd resins" in the more strict sense of the definition, and are obtainable by transesterification (by heating together, optionally in the presence of appropriate catalysts known in the art) of oils (esters of glycerol and unsaturated fatty acids) with ethylene glycol or other polyfunctional alcohols like trimethylol propane, pentaerythritol, and dicarboxylic acids like phthalic or isophthalic acid, adipic acid and maleic acid, or fatty acid dimers, or anhydrides thereof. Such alkyd resins are defined, inter alia, in DIN 53 183, herein incorporated by reference.

Any desired "alkali-stabilized aqueous silica dispersion" can be used. For example, the aqueous silica dispersion can comprise a product which is formed following dispersion of finely divided silicon dioxide or its hydrate forms in water in the presence of alkali, and also a product which forms on hydrolysis of silicon compounds which can be decomposed with water (such as alkoxy-silanes, for example) in an aqueous alkaline medium. Products of this kind are supplied commercially, for example, by the companies Wacker Chemie, Hüls, Dow Corning or Clariant France. The term "silica" refers, accordingly, to the disperse (solid) phase of these dispersions.

The alkaline aqueous silica dispersion can be stabilized directly at the polysilicic acid matrix for example, by employing cations selected from alkali metal and alkaline earth metal cations, ammonium cations and aluminum cations. Additional dispersants or emulsifiers are typically not necessary to stabilize these dispersions and are therefore preferably not present in the silica dispersions which are employed for the invention. Dispersions of any particle size can generally be used. The average particle size of the silica in the dispersions employed in accordance with the present invention is suitably from 5 to 130 nm, preferably from about 10 to about 100 nm and, with particular preference, from about 15 to about 40 nm. Their specific surface area is preferably from 5 to 500 $m^2/g$, more preferably from about 10 to about 400 $m^2/g$. Preference is given to those aqueous silica dispersions of the type described above which have a solids content by mass of from 10 to 80%, more preferably from 20 to 60%, and a pH from about 7.0 to about 14.0. These alkali-stabilized aqueous silica dispersions generally have a slight milky turbidity, and are opalescent, or else can be clear solutions.

The polyester resin employed preferably has an acid number of between 10 and 200 mg/g, more preferably from 30 to 100 mg/g and, with particular preference, from 40 to 70 mg/g.

The acid number is defined by DIN 53 402 (incorporated herein by reference) as the quotient of that mass of potassium hydroxide $m_{KOH}$ that is required to neutralize a sample which is under analysis and the mass $m_B$ of this sample (mass of the solids of the sample in the case of solutions or dispersions); its customary unit is "mg/g".

Suitable polyester resins a can be prepared in any known manner, for example by polycondensation, preferably in the melt, of one or more polyfunctional organic hydroxy compounds aa with one or more polyfunctional or organic carboxylic acids ab. In the mixture and in each case independently of one another, said compounds aa and compounds ab preferably have an average functionality of from 1.3 to 2.5. Particular preference is given to the use in each case of difunctional educts aa and ab. The mixtures of educts aa and ab may, however, also include monofunctional compounds or compounds with a functionality of three or more, the amounts of these preferably being chosen such that the stated limits for the average functionality of the mixture of educts are observed and/or maintained.

The polyfunctional organic hydroxy compounds aa may suitably have from 2 to 6, preferably from 2 to 4, hydroxyl groups and can be derived, for example, from aliphatic linear, branched or cyclic hydrocarbons suitably having from 2 to 20, preferably from 2 to 8 carbon atoms. They can be employed individually or in a mixture. Glycol, 1,2- and 1,3-propylene glycol, 1,4-butanediol, neopentyl glycol, glycerol, trimethylolpropane, sorbitol and pentaerythritol are particularly suitable. It is also possible to employ polyethylene glycol with degrees of polymerization of preferably from 2 to 50 in mass fractions preferably of greater than 0 and up to 10%, especially preferred from 2 to 8%, of the mass of the polyester educts aa and ab, suitably as a comonomer in the condensation. As mentioned above, monoalcohols may also be added, in minor amounts, if needed or desired.

The polyfunctional organic carboxylic acids ab can be aromatic or aliphatic, linear, branched and cyclic carboxylic acids, which can be used individually or in a mixture. They can advantageously have from 2 to 4 carboxylic acid groups, preferably 2 or 3, and may have for example, a total of from 2 to 40, preferably from 3 to 36 carbon atoms. Suitable examples of usable carboxylic acids include succinic, adipic, hexahydrophthalic, phthalic, isophthalic, terephthalic, 2,3- and 2,6-naphthalene dicarboxylic, trimellithic, benzophenonetetracarboxylic and sulfonyldibenzoic acids, and also dimerized fatty acids, preferably having an average of 36 carbon atoms.

It is also possible, as already described above, to replace some of the polyfunctional carboxylic acids by monofunctional carboxylic acids which are preferably cyclic or polycyclic; examples include benzoic acid, or resin acids such as abietic acid. It is likewise possible to replace up to 80% of the amount of substance of components aa and ab by hydroxycarboxylic acids, which each can have at least one hydroxyl and at least one carboxyl group. Examples of suitable compounds include γ-hydroxybutyric acid, ε-hydroxycaproic, para-hydroxybenzoic and also dimethylol-propionic acid.

For the purposes of the invention, it is generally preferred to employ at least one of the above-mentioned modified polyester resins that have been modified for example, with acrylic monomers, by incorporation of urethane structures or epoxy resins, and/or with drying or nondrying fatty acids.

The disclosure content of any documents including patents and patent applications mentioned herein is incorporated into this description by reference as mentioned, supra.

In accordance with a first embodiment of the present invention, using an aqueous silica dispersion, the polyester dispersion that is stabilized in accordance with the invention can be prepared in any known way. For example, a variety of ways are possible which can be used singly or in any combination:

1a) The neutralizing agent can be added to an aqueous silica dispersion. The polyester resin (as it is or partially dissolved in an organic auxiliary solvent) can be emulsified into the dispersion (inverse technique);

1b) The neutralizing agent can be added to an aqueous silica dispersion. This dispersion is emulsified in the polyester resin (which may have been partially dissolved in an organic auxiliary solvent) (direct technique);

1c) The aqueous silica dispersion can be emulsified in the polyester resin (as it is or partially dissolved in an organic auxiliary solvent) and the mixture is subsequently emulsified directly (in analogy to 1b);

1d) inversely (in analogy to 1a) in water which contains neutralizing agent; and/or 1e) The polyester resin can be neutralized in whole or in part with the neutralizing agent ("preneutralization") and is then processed further in accordance with 1a), 1b), 1c) or 1d).

The preparation and incorporation of the silica dispersion can also take place in accordance with embodiment 2 of the present invention, by starting from alkoxysilanes (esters of silicic acid) of the general formula $Si(OR)_4$ or their oligomers of the general formula $RO[Si(OR)_2]_nOR$ where n=2 to 20, the radicals R each being selected independently of one another from methyl, ethyl, n-propyl, isopropyl, n-, iso-, sec- and tert.-butyl radicals and also oligo-ethylene glycol ether radicals $—[CH_2CH_2O]_nR^1$ where n=1 to 10 and $R^1=(CH_2)_n CH_3$ where n=0 to 10; alkylated alkanolamine radicals $—[CH_2]_nNR^2{}_2$ where n=1 to 5 and $R^2=(CH)_2CH_3$ where n =0 to 10, which in each case can be hydrolyzed using water. The radicals R, $R^1$ and $R^2$ may also take on different meanings within the same molecule, that is, they can be the same or different. Suitable compounds include preferably $Si(OCH_3)_4$, $Si(OCH_2CH_3)_4$, $Si(OCH_2CH_2CH_3)_4$, $Si[OCH(CH_3)_2]_4$, $Si[OCH_2CH(CH_3)_2]_4$, $Si(OCH_2CH_2OCH_3)_4$, $Si(OCH_2CH_2OCH_2CH_3)_4$, $Si(OCH_2CH_2OCH_2CH_2CH_3)_4$, $Si[OCH_2CH_2OCH_2CH(CH_3)_2]_4$, $Si(OCH_2CH_2OCH_2CH_2CH_2CH_3)_4$, $CH_3O[Si(OCH_3)_2]_nOCH_3$ where n=2 to 19, $CH_3CH_2O[Si(OCH_2CH_3)_2]_nOCH_2CH_3$ where n=2 to 19, and $Si[O(CH_2)_nN(CH_3)_2]_4$ where n=1 to 5.

This results in the following embodiments of the invention with formation of the silica dispersion in situ:

2a) The acidic, as yet unneutralized polyester, as it is or partially dissolved in an organic solvent, is admixed with the alkoxysilane and a stoichiometric amount of water (sufficient to hydrolyze the alkoxysilane). Hydrolysis of the alkoxysilane takes place with formation of colloidally distributed silica. The hydrolysis intermediates, which contain silanol groups, can undergo condensation to polysiloxanes in a known manner (self-condensation) but are also able to condense with the hydroxyl groups of the polyester. In this embodiment, therefore, there may also be a chemical linkage of the dispersed silica with the polyester. On further addition of water during the emulsification procedure, this linkage is broken again by hydrolysis. The hydrolysis procedure is particularly rapid here if the basic neutralizing agent is used in the course of emulsification.

2b) The acidic, as yet unneutralized polyester, as it is or partially dissolved in an organic solvent, is admixed with the neutralizing agent ("preneutralized"). Following the addition of the alkoxysilane and a stoichiometric amount of water (sufficient to hydrolyze the alkoxysilane), hydrolysis of the alkoxysilane occurs very rapidly. The silanol groups which occur as an intermediate form, immediately undergo self-condensation to form polymeric silicates (silanol groups are totally unstable in an alkali medium). This is followed by emulsification to form an aqueous polyester dispersion.

It may also be useful to prepare the aqueous silica dispersion by hydrolyzing the alkoxysilane in alkaline aqueous solution and then mixing in the polyester resin or the polyester dispersion, after which addition it is also possible to add further water. These embodiments, however, may be less preferred in some instances.

Suitable organic auxiliary solvents include any desired solvents such as alcohols and ether alcohols, preferably monoalkyl ethers of ethylene glycol, diethylene glycol, propylene glycol and dipropylene glycol; particular preference is given to 2-butoxyethanol (butyl glycol) and 2-(2-ethoxyethoxy)ethanol (diethylene glycol monoethyl ether and also 2-(2-methoxy-propoxy)propanol (dipropylene glycol monomethyl ether).

The dispersions of the invention are generally milky to transparent, opaque liquids having a more or less pronounced pseudoplasticity ("shear thinning", i.e., reduction in viscosity at elevated shear). The viscosity may fluctuate somewhat directly after preparation but generally settles down to a constant level which is then retained for many months. Even at very high pH levels of more than 10, the viscosity generally remains constant on storage. Depending on the type of polyester and the amount of a silica (specified as $SiO_2$) present in the dispersion, there may also first of all be an increase in the viscosity, which then, however, reaches a substantially constant level after a few days on storage at room temperature. On storage within a temperature range from 0 to 35° C., the viscosity generally remains constant for at least four months; at from 10 to 30° C. for more than five months; at from 20 to 25° C. for more than 12 months. Even on storage at up to 40° C., the viscosity of the dispersion generally remains unchanged for longer than three months.

By way of aqueous silica dispersions, it is possible to employ generally all current products from a wide variety of manufacturers (for example, Wacker Chemie, Huls AG, Dow Corning, etc.). In such products, the silanol groups of the (poly)silicic acid are mostly capped with alkali metal cations or alkaline earth metal cations. Preference is given to the use of aqueous silica dispersions having a mass fraction of from 1 to 80% of $SiO_2$ in the solid, with particular preference from 20 to 60%, and with a pH of from 7.0 to 14.0. These dispersions may be slightly milky to clear.

When a very high mass fraction of $SiO_2$ of more than 10% or about 10% of the mass of the dispersion is present in supply form, the coatings formed can be (as is known), harder, more scratch resistant and more chemically resistant, and may also have been rendered matte.

The binders prepared using the polyester dispersions viscosity-stabilized in accordance with the present invention find use for example, in compositions for coating materials such as for example, wood, metal, plastic and concrete.

The examples which follow elucidate the invention without restricting it in its scope. All figures given in percent are mass fractions (ratio of the mass of a substance and the sum of the masses of all substances in the mixture; for example, the mass of a dissolved substance divided by the mass of the solution), and parts are units of mass (for example, grams) unless specified otherwise. The viscosities stated are the values for the dynamic viscosity (in accordance with DIN EN ISO 3219) (incorporated herein by reference), measured with a cone and plate instrument at 23° C. and at a shear rate of 10 $s^{-1}$; the customary unit is mPa.s,

EXAMPLE 1

420 parts of a polyester (a) according to Example 1 of AT-B 387 971 (EP-A 0 267 562), which is modified with a drying fatty acid and acrylates, having an acid number of 50 mg/g, partially dissolved 87% in butyl glycol (c), were dispersed in a solution consisting of 512 parts of water (e), 19.5 parts of 25% ammonia (b) and 48.5 parts of a 30% aqueous silica dispersion (d)(®Klebosol R 30). The product had the following characteristics:
mass fraction of solids: about 38%
Acid number: 55 mg/g
Dyn. viscosity: 8500 mPa.s
pH, 10% strength solution in water: 8.4

Following a storage period of 18 months at room temperature in a closed container the viscosity was still about 8400 mPa.s while the control (the same dispersion without addition of silica) had already fallen from an initial level of 9000 mPa.s to about 2000 mpa.s.

EXAMPLE 2

430 parts of an epoxy resin modified with drying fatty acids, in accordance with Example SE1 of EP-A 0 355 761, having an acid number of 45 mg/g, and 6 parts of methoxypropoxypropanol were dispersed in a solution consisting of 484 parts of water, 20 parts of 25% ammonia and 60 parts of a 30% silica dispersion (®Klebosol R 30). The product had the following characteristics:
mass fraction of solids: about 45%
Acid number: 50 mg/g
Dyn. viscosity: 12,300 mPa.s
pH, 10% strength solution in water: 9.5

After a storage period of 18 months the viscosity was still about 12,500 mPa.s whereas the control without addition of silica was already showing a drop from about 12,000 mPa.s to about 3500 mPa.s.

EXAMPLE 3

365 parts of a urethane-modified alkyd resin according to Table 3, Example II/3 of AT-B 375 667 (DE-A 33 15 961), partially dissolved in 55 parts of butyl glycol, were dispersed in a solution consisting of 506.5 parts of water, 25 parts of 25% ammonia and 48.5 parts of a 30% aqueous silica dispersion (®Klebosol R 30). The product had the following characteristics:
mass fraction of solids: about 38%
Acid number: 27 mg/g
Dyn. viscosity: 4500 mPa.s
pH, 10% strength solution in water: 9.0

Within about 5 weeks the viscosity rose to about 6500 mPa.s and after a storage period of 18 months was about 6600 mPa.s, whereas the control without addition of silica was already showing a drop from about 4000 mPa.s to about 800 mPa.s.

EXAMPLE 4

365 parts of an acrylic-modified alkyd resin according to Example A 2 of AT-B 388 921 (EP-B 0 295 403), having an acid number of 49 mg/g, partially dissolved in 55 parts of butyl glycol, and 55 parts of $Si(OCH_2CH_3)_4$ were added to 90 parts of water. After stirring at 70° C. for 6 hours it was no longer possible to detect any tetraethoxysilane. Following the addition of 20 parts of 25% ammonia the mixture was dispersed in 470 parts of water. The product had the following characteristics:
mass fraction of solids: about 38%
Acid number: 55 mg/g
Dyn. viscosity: 2700 mPa.s
pH, 10% strength solution in water: 7.3

Within about 3 weeks the viscosity rose to about 3500 mPa.s and after 18 months was about 3600 mPa.s, whereas the control without the use of $Si(OCH_2CH_3)_4$ had already fallen from an initial level of about 2500 mPa.s to about 200 mPa.s.

EXAMPLE 5

The procedure of Example 4 was repeated but using $Si[OCH_2CH_2N(CH_3)_2]_4$ instead of $Si(OCH_2CH_3)_4$. The viscosity of the aqueous solution rose from 2800 mPa.s to 3300 mPa.s over the course of 3 weeks of storage at room temperature, and remained constant over 18 months. The comparative dispersion without the addition of tetrakis (dimethylaminoethoxy)silane had a viscosity after this 18-month storage period of about 200 mPa.s (see Example 4).

EXAMPLE 6

420 parts of a polyester according to Example 1 of AT-B 387 971 (EP-A 0 267 562), which is modified with drying fatty acids and acrylates, having an acid number of 50 mg/g, partially dissolved 87% in butyl glycol, were dispersed with 19.5 parts of 25% ammonia and 25 parts of a 30% silica dispersion (®Klebosol R 30). 24 parts of tetraethoxysilane were mixed into this solution and the mixture was heated to 70° C. The resulting alcohol was removed by distillation. The mixture was subsequently dispersed in 511.5 parts of water. The product had the following characteristics:
mass fraction of solids: about 38%
Acid number: 55 mg/g
Dyn. viscosity: 9500 mPa.s
pH, 10% strength solution in water: 8.4

After 18 months the viscosity was still about 9400 mPa.s, while the control without silica had already shown a fall from an initial level of about 9500 mPa.s to about 3000 mPa.s.

EXAMPLE 7

The procedure of Example 6 was repeated except that tetraethoxysilane was hydrolyzed first and then the 30% silica dispersion (®Klebosol R 30) was added. The results were as for Example 6.
Evaluation of the Results A coating formulation with viscosity-stabilized polyester dispersions is possible even after a storage period of 18 months. With the control samples, on the other hand, it was no longer possible to formulate a coating material.

The priority document, Austrian patent application no. A-2018/97 filed Nov. 28, 1997, is incorporated herein in its entirety by reference including the title, specification, abstract and claims.

As used herein and in the following claims, the terms "a", "an", "the", etc., can denote the singular or plural form of the word or object that follows.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A viscosity-stabilized aqueous polyester dispersion comprising:
    a) an acid-functional polyester resin,
    b) at least one neutralizing agent for the polyester resin a, the amount of said neutralizing agent present being sufficient to convert from 10 to 200% of the amount of substance of acid groups in the polyester resin a into salt groups, the neutralizing agent being at least one selected from the group consisting of ammonia, organic amines, alkali metal hydroxides and alkaline earth metal hydroxides,
    c) optionally, an organic auxiliary solvent,
    d) an alkali-stabilized aqueous silica dispersion present in an amount such that the mass of $SiO_2$ present in said silica dispersion is from 0.1 to 50% of the mass of said polyester resin a, and
    e) water.

2. A viscosity-stabilized aqueous polyester dispersion as claimed in claim 1, wherein the polyester resin a is obtained by polycondensation of a mixture comprising one or more polyfunctional organic hydroxy compounds aa and one or more polyfunctional organic carboxylic acids ab, each of which independently of the other have an average functionality of from 1.3 to 2.5.

3. A viscosity-stabilized aqueous polyester dispersion as claimed in claim 1, wherein the polyester resin a has been modified during its preparation with at least one compound selected from the group consisting of polyfunctional isocyanates, epoxy resins and saturated and unsaturated fatty acids.

4. A viscosity-stabilized aqueous polyester dispersion as claimed in claim 1, wherein said polyester resin a comprises an acrylic-modified polyester resin which is prepared by emulsion polymerization of one or more olefinically unsaturated monomers in the presence of a water-soluble alkyd resin, the mass fraction of the alkyd resin in the mass of the modified polyester being from 30 to 80% and the mass fraction originating from the olefinically unsaturated monomers being from 20 to 70% in the mass of the modified polyester.

5. A process for preparing a viscosity-stabilized aqueous polyester dispersion as claimed in claim 1, comprising:
    mixing an alkali-stabilized aqueous silica dispersion d, neutralizing agent b, polyester resin a and water e and, optionally organic auxiliary solvent c.

6. A process as claimed in claim 5, wherein the aqueous silica dispersion d is prepared by hydrolysis of one or more alkoxysilanes with water.

7. A process as claimed in claim 5, further wherein said mixing includes:
    admixing said alkali-stabilized aqueous silica dispersion d with an amount of said neutralizing agent b which is selected such that from 10 to 200% of the amount of substance of the dissociable protons of the acid groups of the polyester resin a can be neutralized or bound,
    and subsequently emulsifying the polyester a in said dispersion d.

8. A process as claimed in claim 5, wherein said mixing includes:

admixing said aqueous silica dispersion d with an amount of said neutralizing agent b which is selected such that from 10 to 200% of the amount of substance of the dissociable protons of the acid groups of the polyester resin a can be neutralized or bound, and subsequently emulsifying said dispersion in the polyester resin a, which optionally may have been partially dissolved in said organic auxiliary solvent c.

9. A process as claimed in claim 5, wherein said mixing includes:

dispersing said aqueous silica dispersion d in the polyester resin a, which optionally may have been partially dissolved in said organic auxiliary solvent c, to form a mixture;

subsequently emulsifying said mixture, directly or inversely, in said water e, containing said neutralizing agent b, the amount of said neutralizing agent b being selected such that from 10 to 200% of the amount of substance of the dissociable protons of the acid groups of the polyester resin a can be neutralized or bound.

10. A binder for a coating composition comprising a viscosity-stabilized aqueous polyester dispersion as claimed in claim 1.

11. A viscosity-stabilized aqueous polyester dispersion as claimed in claim 1, wherein said polyester resin has an acid number of between 10 and 200 mg/g.

12. A viscosity-stabilized aqueous polyester dispersion as claimed in claim 1, wherein said polyester resin is modified with at least one of (i) an acrylic monomer, (ii) by incorporation of a urethane structure or epoxy resin, or (iii) with drying or nondrying fatty acids.

13. A viscosity-stabilized aqueous polyester dispersion as claimed in claim 1, wherein said auxiliary organic solvent is included and comprises an alcohol or an ether alcohol selected from the group consisting of a monoalkyl ether of ethylene glycol, diethylene glycol, propylene glycol and dipropylene glycol.

14. A viscosity-stabilized aqueous polyester dispersion as claimed in claim 1, wherein the amount of said neutralizing agent converts 40 to 70% of the acid groups in the polyester resin a into salt groups.

15. A viscosity-stabilized aqueous polyester dispersion as claimed in claim 1, wherein the average particle size of the silica in said aqueous silica dispersion is from 5 to 130 nm, and said aqueous silica dispersion has a mass fraction of solids of from 10 to 80%.

16. A method for preparing a viscosity-stabilized aqueous polyester dispersion as claimed in claim 1, comprising:

obtaining the polyester resin a by polycondensation of a mixture comprising one or more polyfunctional organic hydroxy compounds aa and one or more polyfunctional organic carboxylic acids ab, each of which independently of the other have an average functionality of from 1.3 to 2.5; and mixing said resin with components b, d, e, and optionally c.

17. A method for preparing an aqueous polyester dispersion as claimed in claim 1, comprising at least one of the following:

1a) adding the neutralizing agent to said aqueous silica dispersion and said polyester resin, which optionally may be partially dissolved in said organic auxiliary solvent, and emulsifying the resultant into a dispersion;

1b) adding said neutralizing agent to said aqueous silica dispersion, and emulsifying the resultant dispersion in said polyester resin, which optionally may have been partially dissolved in said organic auxiliary solvent;

1c) emulsifying said aqueous silica dispersion in the polyester resin, which optionally may be partially dissolved in said organic auxiliary solvent, and subsequently emulsifying the resultant mixture directly;

1d) inversely adding water containing the neutralizing agent to said aqueous silica dispersion and said polyester resin, which optionally may be partially dissolved in said organic auxiliary solvent, and emulsifying the resultant into a dispersion;

1e) neutralizing the polyester resin in whole or in part with the neutralizing agent and then processing the resultant further in accordance with 1a), 1b), 1c) or 1d).

18. An aqueous polyester dispersion prepared using a process comprising at least one of the following:

1a) adding a neutralizing agent to an aqueous silica dispersion and a polyester resin, which optionally may be partially dissolved in an organic auxiliary solvent, and emulsifying the resultant into a dispersion;

1b) adding a neutralizing agent to an aqueous silica dispersion, and emulsifying the resultant dispersion in a polyester resin, which optionally may have been partially dissolved in an organic auxiliary solvent;

1c) emulsifying an aqueous silica dispersion in a polyester resin, which optionally may be partially dissolved in an organic auxiliary solvent, and subsequently emulsifying the resultant mixture directly;

1d) inversely adding water containing a neutralizing agent to an aqueous silica dispersion and a polyester resin, which optionally may be partially dissolved in an organic auxiliary solvent, and emulsifying the resultant into a dispersion;

1e) neutralizing a polyester resin in whole or in part with a neutralizing agent and then processing the resultant further in accordance with 1a), 1b), 1c) or 1d), wherein in each case, said polyester resin comprises: a) an acid-functional polyester resin, said neutralizing agent comprises: b) at least one neutralizing agent for the polyester resin a, the amount of said neutralizing agent present being sufficient to convert from 10 to 200% of the amount of substance of acid groups in the polyester resin a into salt groups, the neutralizing agent being at least one selected from the group consisting of ammonia, organic amines, alkali metal hydroxides and alkaline earth metal hydroxides, said aqueous silica dispersion comprising: d) an alkali-stabilized aqueous silica dispersion present in an amount such that the mass of $SiO_2$ in silica present in said silica dispersion is from 0.1 to 50% of the mass of said polyester resin a.

* * * * *